Nov. 19, 1963 N. C. FORD, JR 3,111,652

HIGH SPEED THIN MAGNETIC FILM MEMORY ARRAY

Filed Feb. 3, 1959 2 Sheets-Sheet 1

INVENTOR
NORMAN C. FORD JR.

BY William V. Schelberg
AGENT

Nov. 19, 1963 N. C. FORD, JR 3,111,652

HIGH SPEED THIN MAGNETIC FILM MEMORY ARRAY

Filed Feb. 3, 1959 2 Sheets-Sheet 2

United States Patent Office 3,111,652
Patented Nov. 19, 1963

3,111,652

HIGH SPEED THIN MAGNETIC FILM MEMORY ARRAY

Norman C. Ford, Jr., Poughkeepsie, N.Y., assignor to International Business Machines Corporation, New York, N.Y., a corporation of New York Filed Feb. 3, 1959, Ser. No. 790,901
5 Claims. (Cl. 340—174)

Figures 1A, 1B, 1C:
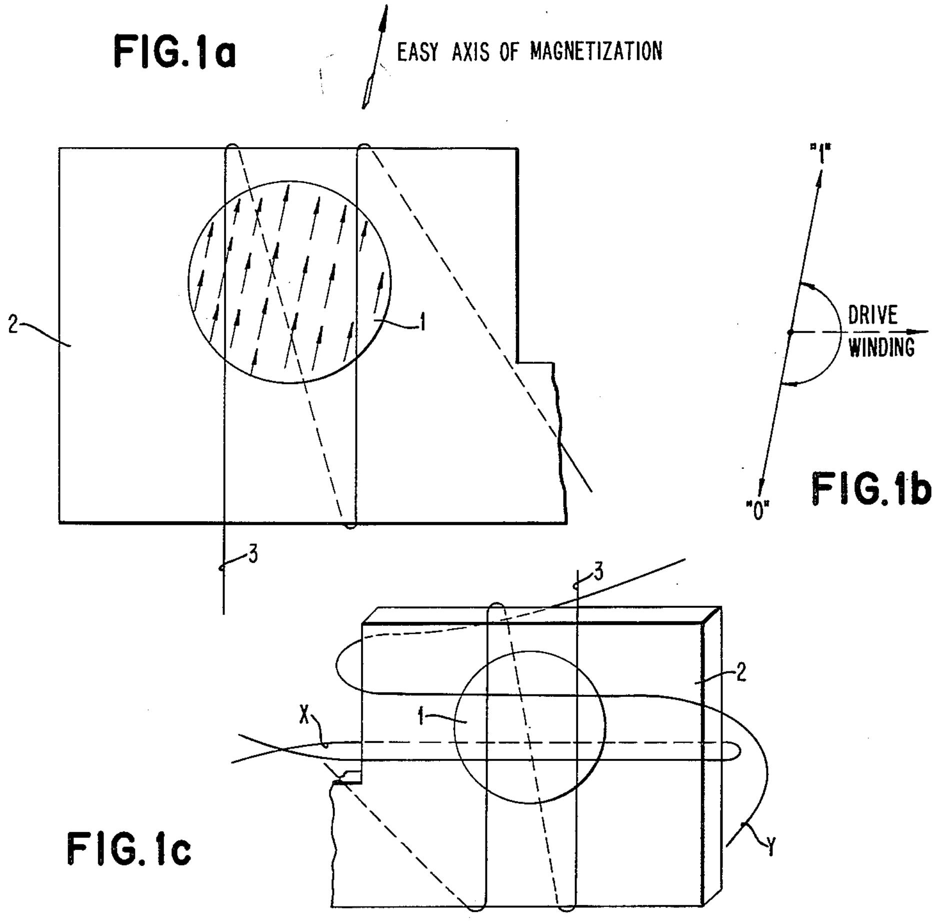

This invention relates to a thin magnetic film memory array and more particularly to a high-speed storage system for digital information employing a thin magnetic alloy exhibiting the square or rectangular hysteresis loop characteristic.

In general it is known in the art that thin films of a particular alloy composition may be prepared so as to exhibit the rectangular hysteresis loop and switching threshold field characteristic of memory core ferrite materials. In these films, the magnetization vector may be oriented in a preferred direction in the plane of the film designated as the "easy direction" or "easy axis" of magnetization. Bistable thin film elements of this kind may be switched from one direction along the easy axis to the opposite direction by a magnetic field of sufficient magnitude applied along said axis. One mode of switching occurs when all the components in the film reverse simultaneously, a process termed "rotational switching." This mode of switching is observed to be faster than a second mode called "wall motion switching" in which an area of reversed magnetization grows at the expense of an unreversed area. Accordingly, it has been the object of considerable research to provide thin film memory arrays which will accomplish switching by a rotational process. In the design of such an array, unlike the case of a ferrite core matrix, the position of the switching field in relation to the easy axis must be taken into account.

An object of the present invention, therefore, is to construct apparatus which will function as a high speed thin magnetic film memory system.

A further object is to provide a three dimensional coincident-current memory selection system utilizing bistable thin film elements, which will switch by the high speed rotational process.

Still another object is to prepare a high speed thin magnetic film memory array having an advantageous arrangement of circuit elements.

Among the other objects is to provide a fast switching memory array having a low noise factor, a large sense signal, a low drive current requirement and one which is readily fabricated by automatic machinery.

Other objects of the invention will be pointed out in the following description and claims and illustrated in the accompanying drawings which disclose, by way of example, the principle of the invention and the best mode, which has been contemplated, of applying that principle.

In the drawings:

FIG. 1*a* shows a single bit of thin film memory material positioned on a substrate member.

FIG. 1*b* is a representation of the two stable states of magnetization present in the element.

FIG. 1*c* shows the arrangement of the drive and sense windings for a single memory bit.

Figure 1D:
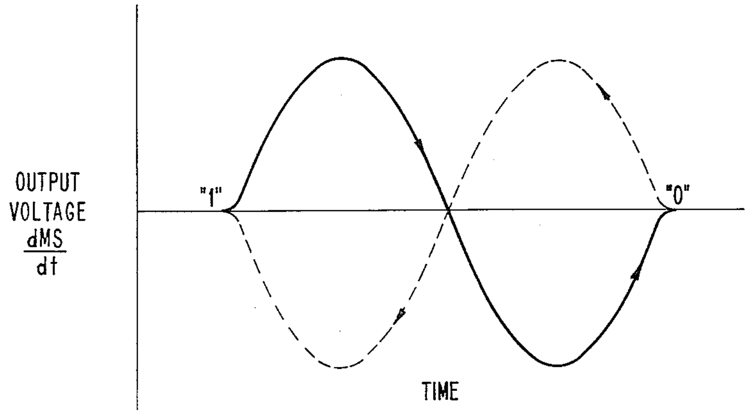

FIG. 1*d* shows the relation of output voltage with time for switching between stable states of flux remanence.

Figure 2:
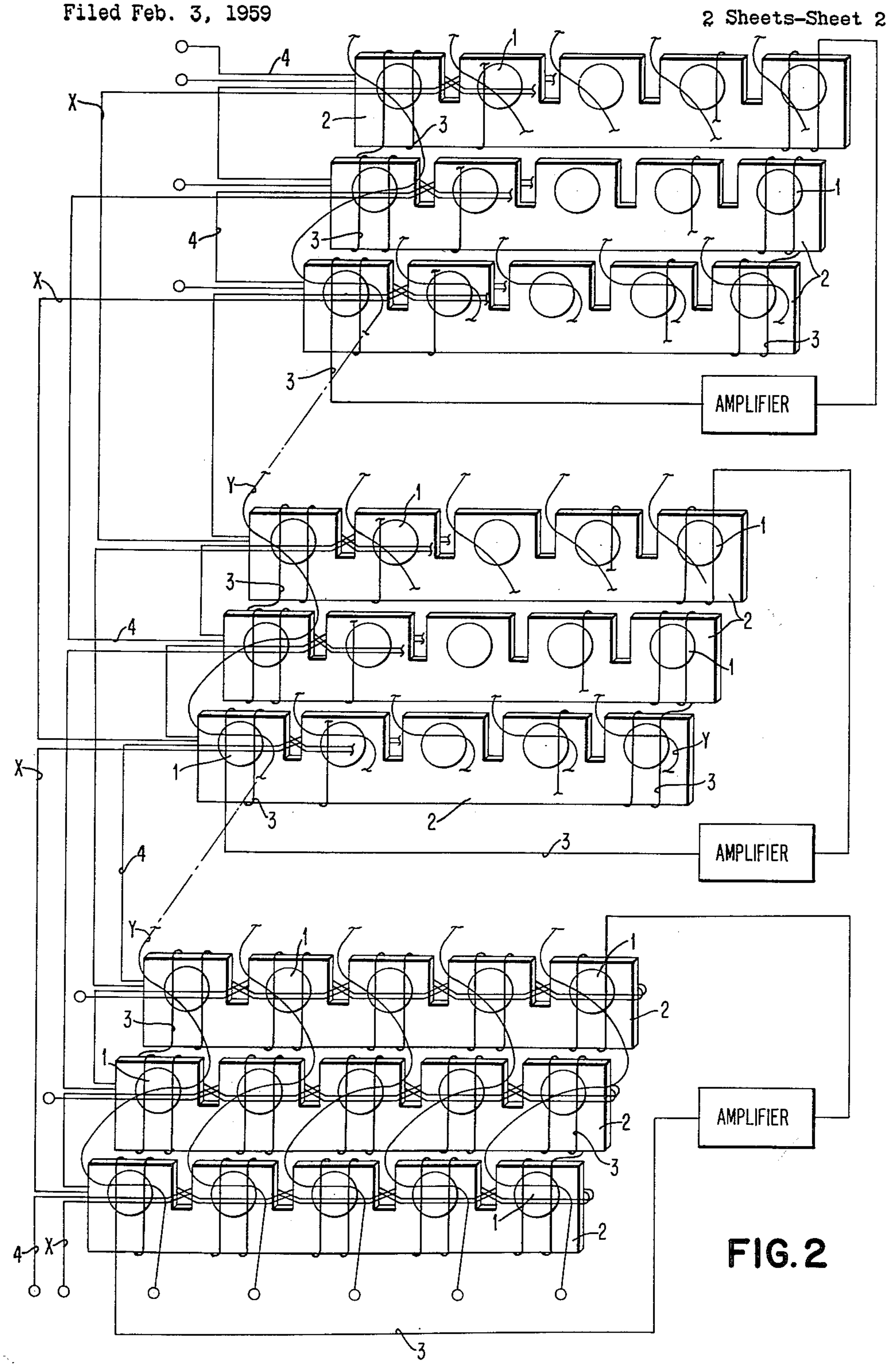

FIG. 2 shows an exploded isometric view of the three dimensional thin film memory array according to the present invention.

The thin magnetic film elements utilized in the present memory array may be prepared by conventional vacuum evaporation or electroplating techniques wherein a thin metallic alloy comprising for example, an 80–20 mol percent ratio of nickel-iron is deposited on a suitable substrate in the form of spots of magnetic material deposited on a suitable substrate member. The easy axis of magnetization of the film may be induced by ascribing appropriate lines on the substrate member prior to metal deposition, as described in the copending application, Serial No. 774,656, filed November 18, 1958 and now U.S. Patent No. 3,019,125, and assigned to the same assignee as this invention, or by imposing an orienting external magnetic field during the deposition process.

According to the practice of this invention, as shown in FIG. 1*a*, it is preferable that the easy axis of the film 1 be at a slight angle, preferably from 5° to 40°, to the vertical direction of the substrate 2. The easy axis assumes a geometrical relationship to the drive windings as shown in FIG. 1*b*, which assures that the entire magnetic vector will rotate in the same direction to induce an output signal characteristic of a "1" or "0" state of the element. It is preferable that the film be round in order to reduce the demagnetizing fields which cause a shearing or rounding of the B-H hysteresis loop and result in a smaller permissible half-selection signal. For illustrative purposes, a circular film is shown having a diameter of about 0.1 inch and a thickness between 500 A. and 5,000 A.

After the thin film element has been prepared as described above, sense windings or turns 3 are wound around the film, as shown most particularly in FIGURE 1*c*. A number of sense turns are provided so as to give a desired output signal magnitude. Drive windings X and Y are shown in FIGURE 1*c* and are wound around the bit at a slight angle from the perpendicular to the easy direction of magnetization of the film; thereby the output flux is generated in one direction in the bit and a large discrimination between stable states of magnetization realized.

FIG. 2 shows a three-dimensional high-speed thin magnetic film array operating by a coincident-current selection scheme, such as the type selection scheme described in detail in an application entitled "Magnetic Memory System," U.S. Serial No. 442,013, filed July 8, 1954, by Munroe K. Haynes, and assigned to the same assignee as the invention, now U.S. Patent 2,881,414. The half-select drive windings X and Y are threaded around the memory bits so as to be as nearly perpendicular as possible to the sense windings. In this manner, the noise pickup or coupling between the drive and the sense windings is reduced to a minimum. An inhibit winding 4 is provided. The inhibit winding may be utilized to induce a field opposite to that generated by the drive windings to prevent switching in the element. While only two sense winding turns are shown, as many as required to provide a high output signal may be built into this memory array. Furthermore, any number of drive turns may be employed to provide the individual drive currents needed to exceed the rotational threshold coercive force of the film.

The operating speed of the present memory array is in the order of 0.1 microsecond with an energy field of 0.2 ampere applied through five drive turn windings.

The noise on the sense winding arranged perpendicular to the drive windings according to the present invention was observed to be a factor of ten smaller than for an array in which the sense winding was parallel to the drive windings.

The operation of the memory array as shown follows much of the same procedure as conventional coincident-current selection schemes. When both drive windings X and Y associated with a given memory bit are energized, in the absence of an inhibit current, the magnetization vector of the film will switch from one remanent state to another by a rotational process, and induce an output signal in the sense winding, which signal is fed through a sense amplifier to indicate either a binary one or zero in that bit.

In coincident operation, it is preferable that the thin film have a characteristic such that the threshold field required to switch by wall motion be at least greater than one-half of the field required to induce rotational switching. If this condition is satisfied rotational switching will occur when both drive windings are energized while no switching will take place when only one is applied. Films having these characteristics may be readily prepared, as for example, by the process described in the aforementioned application Serial No. 774,656.

In addition to the advantages previously attributed to the memory array of this invention, the wiring configurations shown herein may be ready fabricated using automatic machinery and printed circuit techniques.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An information storage element comprising a thin film of magnetic material having an axis of easy magnetization wherein magnetization in one direction and in an opposite direction thereto is representative of two binary states, field applying means including a pair of drive conductors coupling said element for switching said magnetic material from one of said states to the other, and sensing means including a conductor disposed in quadrature to said field applying means conductors, for detecting reversals of magnetization direction produced by said field applying means, said axis of easy magnetization and said sensing means conductor forming an angle in the range of 5° to 40°.

2. A high speed information storage device comprising a plurality of bistable magnetic thin film elements having substantially rectangular hysteresis properties, the direction of magnetization indicating the information representing state of said magnetic elements, a plurality of coordinate energizing means associated with each magnetic element, the coincident energization of said coordinate energizing means associated with a selected element producing a magnetic field thereat in a given direction and having a magnitude greater than the threshold coercive force of said magnetic element, and sensing means having a conductor disposed in substantially said given direction for detecting reversals of magnetization direction produced by said energizing means.

3. A two-dimensional memory storage array comprising a plurality of magnetic thin film elements arranged in rows and columns, said magnetic elements having an axis of easy magnetization wherein magnetization in one and in the other direction is representative of two binary states, each of said elements having coordinate energization means associated with one of said rows and one of said columns, said coordinate energizing means being adapted to produce a magnetic field along a given axis and having an intensity greater than the coercive force threshold of said magnetic element and a direction determined by the polarity of the signals applied thereto, said direction being opposite to that indicative of the state of said magnetic element, thereby causing rotational switching of said element from one direction of magnetization to the other, and sensing means including a conductor disposed parallel to said given axis in each of said rows and columns for detecting reversal of magnetization direction of any element within said rows and columns produced by said energizing means.

4. An information storage element comprising a thin film of magnetic material having a bi-directional axis of easy magnetization representative of two binary states, energizing means associated with said film for generating a field in substantially one of said directions of magnetization at said film, and sensing means including a conductor disposed parallel to said field for detecting a change in the state of said element.

5. A multi-coordinate storage system comprising a plurality of interconnected substantially identical planes of magnetic elements, said magnetic elements comprising segments of thin film magnetic material, each of said planes comprising a plurality of magnetic elements having a substantially identical rectangular hysteresis characteristic wherein the direction of magnetization indicates the information representing state of said element, a plurality of coordinate energizing means associated with each element, the coincident energization of said coordinate energizing means associated with a selected element in each of said planes adapted to produce a magnetic field thereat in a given direction and having a magnitude greater than the rotational coercive force theshold of said magnetic element, and sensing means including a conductor disposed along said given direction for detecting reversal of magnetization of any element within the plane.

References Cited in the file of this patent

"Nondestructive Sensing of Magnetic Cores," by Buck and Frank, published in "Communications & Electronics," January 1954, pages 822–830.

"The Nondestructive Read-Out of Magnetic Cores," by Papoulis, published in "Proceedings of the I.R.E.," August 1954, pages 1283–1288.

"A New Nondestructive Read for Magnetic Cores," by Thorensen and Arsenault, published in "1955 Western Joint Computer Conference, March 1–3, 1955," August 1955, pages 111–116.

"A Compact Coincident-Current Memory," Pohm and Rubens, published in "Proceedings of the Eastern Joint Computer Conference," Dec. 10–12, 1956; pages 120–123.

"Thin Films, Memory Elements," published in "Electrical Manufacturing," Vol. 61, No. 1, January 1958, pages 95–98.